(12) United States Patent
Habib et al.

(10) Patent No.: US 12,344,556 B2
(45) Date of Patent: Jul. 1, 2025

(54) METHOD FOR CALCINING MINERAL ROCK IN A REGENERATIVE PARALLEL-FLOW VERTICAL SHAFT FURNACE AND FURNACE USED

(71) Applicant: S.A. Lhoist Recherche et Developpement, Ottignies Louvain-la-neuve (BE)

(72) Inventors: Ziad Habib, Linkebeek (BE); Olivier Van Cantfort, Woluwe-Saint Pierre (BE); Tristan Cloarec, Urdo (FR)

(73) Assignee: S.A. LHOIST RECHERCHE ET DEVELOPPEMENT, Ottignies-Louvain-la-Neuve (BE)

( * ) Notice: Subject to any disclaimer, the term of this patent is extended or adjusted under 35 U.S.C. 154(b) by 285 days.

(21) Appl. No.: 18/009,910

(22) PCT Filed: Jun. 28, 2021

(86) PCT No.: PCT/EP2021/067734
§ 371 (c)(1),
(2) Date: Dec. 12, 2022

(87) PCT Pub. No.: WO2022/002869
PCT Pub. Date: Jan. 6, 2022

(65) Prior Publication Data
US 2023/0227353 A1    Jul. 20, 2023

(30) Foreign Application Priority Data

Jul. 3, 2020 (BE) .................................. 2020/5498
Nov. 27, 2020 (WO) ................. PCT/EP2020/083769

(51) Int. Cl.
*C04B 2/12* (2006.01)
*F27B 1/04* (2006.01)
(Continued)

(52) U.S. Cl.
CPC .................. *C04B 2/12* (2013.01); *F27B 1/04* (2013.01); *F27B 1/20* (2013.01); *F27B 1/21* (2013.01); *F27B 1/22* (2013.01); *F27B 1/24* (2013.01)

(58) Field of Classification Search
CPC .... C04B 2/12; Y02P 40/40; F27B 1/04; F27B 1/20; F27B 1/21; F27B 1/22; F27B 1/24
See application file for complete search history.

(56) References Cited

U.S. PATENT DOCUMENTS 4,315,735 A * 2/1982 Fussl .......................... C04B 2/12
                                                                          423/175
5,460,517 A * 10/1995 Scheibenreif ............. F27B 1/04
                                                                          432/98
(Continued)

FOREIGN PATENT DOCUMENTS

AT          336473 A          8/1976
CN       105000811 A  *     10/2015
(Continued)

OTHER PUBLICATIONS

PCT/EP2021/067734, International Search Report, Aug. 11, 2021, 2 pages.
(Continued)

*Primary Examiner* — Gregory A Wilson
(74) *Attorney, Agent, or Firm* — Whitaker Chalk Swindle & Schwartz PLLC; Charles D. Gunter

(57) ABSTRACT

A method for calcining mineral rock in a regenerative parallel-flow vertical shaft furnace including the steps of collecting a portion of the gaseous effluent discharged, in preheating mode, from the furnace shaft in a recirculating circuit, forming an oxidizing mixture by mixing the portion collected from the gaseous effluent with concentrated dioxygen from a dioxygen source, and inserting the oxidizing mixture into the top of the shaft in firing mode so as to
(Continued)

ensure the combustion of fuel in the presence of oxygen. The gaseous effluent discharged from the furnace having a high concentration of $CO_2$.

16 Claims, 5 Drawing Sheets

(51) Int. Cl.
- *F27B 1/20* (2006.01)
- *F27B 1/21* (2006.01)
- *F27B 1/22* (2006.01)
- *F27B 1/24* (2006.01)

(56) References Cited

U.S. PATENT DOCUMENTS

| | | | |
|---|---|---|---|
| 6,113,387 A * | 9/2000 | Wilson | F27B 1/005 432/99 |
| 7,384,263 B2 * | 6/2008 | Piringer | F27D 17/004 432/101 |
| 11,280,546 B2 * | 3/2022 | Habib | F27B 1/24 |
| 2020/0048146 A1 | 2/2020 | Zhang et al. | |

FOREIGN PATENT DOCUMENTS

| | | | | |
|---|---|---|---|---|
| CN | 111302675 A | * | 6/2020 | C04B 2/12 |
| DE | 19845495 A1 | * | 8/1999 | C04B 2/12 |
| DE | 19843820 A1 | | 3/2000 | |
| DE | 102010019330 A1 | | 11/2011 | |
| DE | 3359502 A1 | | 8/2018 | |
| GB | 2075163 A | * | 11/1981 | C04B 2/12 |
| JP | 2002060254 A | | 2/2002 | |
| JP | 5711855 A1 | | 1/2016 | |
| WO | 2012072332 A1 | | 6/2012 | |
| WO | 2017153267 A1 | | 9/2017 | |

OTHER PUBLICATIONS

Piringer, Hannes; Lime Shaft Kilns; Science Direct; Energy Procedia 120 (2017) 75-95; www.sciencedirect.com.

* cited by examiner

METHOD FOR CALCINING MINERAL ROCK IN A REGENERATIVE PARALLEL-FLOW VERTICAL SHAFT FURNACE AND FURNACE USED

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not applicable.

STATEMENT REGARDING PRIOR DISCLOSURES BY THE INVENTOR OR A JOINT INVENTOR

Not applicable.

BACKGROUND OF THE INVENTION

(1) Field of the Invention

The present invention relates to a method for calcining carbonate mineral rock in a regenerative parallel-flow vertical shaft furnace and to the furnace used.

(2) Description of Related Art Including Information Disclosed Under 37 CFR 1.97 and 1.98

The regenerative parallel-flow vertical shaft furnace or Parallel Flow Regenerative Kiln (PFRK) has an energy efficiency of 85% to 90%; it is the highest in the lime sector, even in the entire energy-intensive cement, steel and glass industry. In Europe, 60% of the lime is produced in this type of furnace. This proportion is set to increase in Europe and worldwide, taking into account the roadmaps for energy and ecological transition.

The 'PFRK' furnace is a vertical double-shaft furnace where the fuel is injected alternately in one shaft then in another for approximately 10 to 15 minutes with a stop period between cycles of approximately 1 to 2 minutes to reverse the air and fuel circuits. This is the "reversing" period. The two shafts are connected via a connecting flue. When a shaft is combusting (firing mode), the hot combustion fumes pass through the connecting flue (gas transfer channel) and give a portion of their heat to the mineral rock to be calcined in order to preheat it in the other shaft in regeneration or preheating mode. The shafts of the PFRK furnace are either cylindrical or rectangular. In some cases, there are three shafts, two in preheating mode and one in firing mode. The problems and solutions outlined below are valid for all PFRK furnace geometries.

The method used in these known furnaces comprises, in production mode:
loading the carbonate mineral rock at the top of the furnace,
preheating said rock,
firing said rock with the decarbonation thereof to calcined material,
cooling the calcined material using cooling air, and
unloading the calcined material at the bottom of the shafts,
each shaft operating alternately in firing mode and in preheating mode, one shaft being in firing mode for a predetermined time period while at least one other shaft is in preheating mode and vice-versa,
the firing mode comprising: said loading of carbonate mineral rock at the top of the shaft in firing mode, in the presence of said preheated carbonate mineral rock descending into this shaft, combusting fuel in the presence of oxygen so as to obtain said firing of this rock and the decarbonation thereof into calcined material with the release of combustion fumes in the form of a gaseous stream descending co-currently in the shaft in firing mode, and said gaseous stream containing these combustion fumes moving from the shaft in firing mode to said at least one shaft in preheating mode using said gas transfer channel,
the preheating mode comprising:
said preheating of the loaded carbonate mineral rock via heat exchange with the gaseous stream containing the combustion fumes, from the gas transfer channel, which is ascending in said at least one shaft in preheating mode counter-currently to said loaded carbonate mineral rock, and
discharging a gaseous effluent based on the gaseous stream containing the combustion fumes from the furnace, at the top of said at least one shaft in preheating mode.

Within the meaning of the present invention, carbonate mineral rock, in particular, means limestone rock, dolomite rock and/or magnesite, which calcine respectively into quicklime, calcined dolomite and/or magnesia. The equation for the calcination of limestone to lime is as follows:

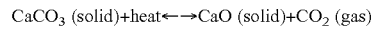

$$CaCO_3 \text{ (solid)} + \text{heat} \leftrightarrow CaO \text{ (solid)} + CO_2 \text{ (gas)}$$

This is a reversible endothermic reaction and the lime recombines with the $CO_2$ at the first opportunity below 900° C., with an equilibrium and more or less fast kinetics depending on the temperature and the ambient concentration of $CO_2$.

Therefore, during this process, the initial limestone or dolomite rock releases a large volume of $CO_2$ during the calcination thereof into lime or dolomite. Moreover, high temperatures must be reached to carry out this calcination and therefore fuels must be burned which, in turn, causes a large amount of $CO_2$ to be released. Overall, calcination methods have the disadvantage of actively contributing to the greenhouse effect.

This common calcination method also has the disadvantage that the fuel is burnt with air and the calcined product is cooled by air. This results in a gaseous effluent being released at the top of the furnace having a high level of diatomic nitrogen and a comparatively low level of $CO_2$ (volume concentration of about 20% to 27% on dry gas) which is costly to capture because of the large presence of dinitrogen from the air used.

To capture this $CO_2$, it may be considered to use the method of abatement by chemical solvent called "amines", which is the most widespread technique applied to the furnace fumes at the end of the line, after the dust collection filter. But the cyclical feature of the PFRK furnace with a furnace stop of 1 to 2 minutes every 10 to 15 minutes is incompatible with this technique, which is also very costly and involves a solvent that is not sustainable in terms of environmental legislation.

To be able to capture the $CO_2$ emitted in a PERK furnace, replacing all the air from the method, combustion air carrying the solid fuel and cooling air, with recycled combustion fumes and introducing pure oxygen into the shaft in firing mode has already been proposed in the method used (see CN105000811). For any person skilled in the art, it is clear that this process is unfeasible, since the lime will recarbonate during cooling. As seen above, the $CO_2$ cannot be recirculated to cool the lime, since the lime will immediately recombine with this $CO_2$ to reform $CaCO_3$. On the other hand, using pure oxygen at the top of the furnace poses serious problems in terms of material compatibility and this input will not be a sufficient mass flow to effectively recover the heat accumulated in the regeneration area. The disadvantages and feasibility problems of this method have already been discussed in the patent application US2020/0048146.

It should also be noted that the cooling air in the PFRK furnace, in contrast to the rotary furnace, for example, does not have a direct impact on combustion and the calcination process in the shaft in firing mode. It has no expected effect on the quality of the product.

Production mode means that the furnace is in normal service during which it continuously produces calcined material. This mode therefore does not apply to the start-up and shut-down phases of the furnace or to maintenance in the event of a malfunction.

The present invention aims to at least partially remedy the problem of significant $CO_2$ emissions into the atmosphere from PFRK-type furnaces, without changing the cyclical operation thereof and with few or no changes to the structure thereof. It also aims to make it possible to capture the $CO_2$ present in the gaseous effluents emitted by the furnace.

BRIEF SUMMARY OF THE INVENTION

To solve this problem, the present invention has provided a method for calcining mineral rock in a regenerative parallel-flow vertical shaft furnace as mentioned at the beginning, this method further comprising:
  collecting a portion of the gaseous effluent discharged from the furnace,
  forming an oxidising mixture by mixing this collected portion of the gaseous effluent discharged from the furnace with concentrated dioxygen, and
  introducing this oxidising mixture at the top of the shaft in firing mode so as to ensure said fuel combustion in the presence of oxygen, the gaseous effluent discharged from the furnace having a high concentration of $CO_2$.

Fuel combustion in concentrated dioxygen would result in flame temperatures that are too high for the usual furnace equipment. It is also provided, according to the invention, to collect a portion of the gaseous effluent rich in $CO_2$ and to mix it with the dioxygen. Instead of a usual oxidant formed from the $O_2+N_2$ mixture of air, a mixture of $O_2+CO_2$ at an appropriate flame temperature is thus obtained.

Fuel combustion in dioxygen results in the gaseous stream containing the combustion fumes and in the calcination of the carbonate rock. This produces mainly $CO_2$ with some impurities, present as traces in the fuel and in the material to be calcined, and some oxygen not used up by the fuel combustion. Naturally, these combustion fumes also contain the $CO_2$ supplied to the oxidising mixture. This evidently results in a significant increase in the $CO_2$ content of the gaseous effluent discharged from the top of the furnace, compared to the conventional method, According to the invention, a gaseous effluent concentrated in $CO_2$ means that it has a $CO_2$ content of at least 35%, advantageously at least 45%, preferably at least 60%, especially at least 80% and particularly advantageously at least 90% by volume on dry gas. This $CO_2$ can then be used or sequestered under favourable conditions, drastically decreasing the contribution of the furnace to the greenhouse effect.

The use of this method does not necessarily require any particular design of the furnace itself. The only changes to be made to the furnace may be simply external to the furnace and consist of changing the effluent circuits leaving the furnace and providing at least one source of concentrated dioxygen.

According to the invention, concentrated dioxygen (hereinafter referred to as oxygen), means a gas whose oxygen level exceeds 50% by volume. It will preferably be equal to or greater than 90%, in particular 93%, advantageously 98 to 100% by volume. The source of concentrated dioxygen may, for example, be an air separation unit that separates air into dioxygen and dinitrogen and works in parallel with the furnace, or a dioxygen tank installed next to the furnace. Advantageously, the fuel combustion occurs in the presence of an excess of oxygen, preferably of about 5 to 50%, in particular of 10 to 30%, advantageously of 15 to 25% by volume relative to stoichiometric combustion requirements.

According to the invention, fuel means any solid, liquid or gaseous fuel, for example natural gas, hydrogen, biogas, fuel oil, oils, coal or coke powder, solid biomass, such as sawdust, solid recovered fuel, such as plastics, paper, cardboard, etc. Advantageously, in the case of a solid fuel, the introduction thereof into the shaft in firing mode is carried out in a granular or powdered form using a portion of said collected portion of the gaseous effluent discharged from the furnace as a carrier gas. $CO_2$ from any other source may also be provided as a carrier gas.

According to an embodiment of the invention, cooling the calcined material comprises, at the bottom of each of the shafts, supplying cooling air which flows counter-currently through the descending calcined material and is heated on contact with it, the heated cooling air mixing with the gaseous stream containing the combustion fumes in the shaft in firing mode before moving through the gas transfer channel and, after moving, with this gaseous stream in said at least one shaft in preheating mode, the gaseous effluent concentrated in $CO_2$ discharged from the furnace containing the combustion fumes and the cooling air. In this case, only the combustion air of the conventional method is replaced by the oxidising mixture based on the gaseous effluent concentrated in $CO_2$, discharged from the furnace, and oxygen. Such a method makes it possible to increase the $CO_2$ content of the gaseous effluent discharged from the conventional PFRK furnace from 20 to 27% by volume on dry gas to a value of at least 35%, advantageously at least 45%, and even up to 65% by volume on dry gas in a furnace according to the invention. For illustration, a PFRK furnace using this method may advantageously replace the coke oven currently used in soda ash plants, to provide fumes with 40% $CO_2$ by volume. Additionally, the PFRK is a "sustainable", energy-efficient furnace, and above all it removes all environmental problems linked to coke ovens, including significant emissions of pollutants (CO, $NH_3$, $H_2S$, etc.).

According to a particular embodiment of the invention, the cooling air is supplied to the furnace in a total volume equal to or less than a thermodynamic minimum necessary to cool the calcined material to a reference temperature of 100° C. Advantageously, the total volume of cooling air supplied to the furnace may be about 40 to 60% of said thermodynamic minimum, preferably equal to 50% thereof. In this case, the unloaded product will have a higher temperature than normal operation. It is therefore necessary to adapt the unloading equipment to materials resistant to this temperature.

It may also advantageously be provided that said cooling of the calcined material comprises, at the bottom of the only shaft in firing mode, supplying cooling air which flows counter-currently through the descending calcined material and is heated on contact with it, the heated cooling air mixing with the gaseous stream containing the combustion fumes before moving through the gas transfer channel, and the gaseous effluent concentrated in $CO_2$ discharged from the furnace containing the combustion fumes and the cooling air. In this case too, the cooling air may be supplied to the furnace in a total volume lower than a thermodynamic minimum necessary to cool the calcined material to a reference temperature of 100° C. Advantageously, the total volume of cooling air supplied to the furnace may thus be about 40 to 60% of said thermodynamic minimum, preferably equal to 50% thereof.

According to a particularly advantageous embodiment of the invention, said cooling of the calcined material comprises, at the bottom of each of the shafts or at the bottom of the only shaft in firing mode, supplying cooling air which flows counter-currently through the descending calcined material and is heated on contact with it, the method further comprising removing the heated cooling air from the furnace, the gaseous effluent discharged from the furnace containing a $CO_2$ content of at least 90% by volume on dry gas, preferably at least 95%. In this case, the gaseous effluent discharged from the furnace is formed almost exclusively from combustion fumes. It becomes possible to use such a gas in specialised industries or to sequester it.

According to a particular embodiment of the invention, the method further comprises a heat exchange between the heated cooling air removed from the furnace and said collected portion of gaseous effluent discharged from the furnace, before or after it is mixed with concentrated dioxygen. This allows heat recovery in the oxidising mixture to be introduced into the shaft in firing mode.

Other details and features of the method according to the invention are mentioned in the appended claims.

The present invention also relates to a PFRK-type regenerative parallel-flow vertical shaft furnace.

Such a furnace comprises:
at least two shafts interconnected by a gas transfer channel, each of said shafts comprising, in the on or off position,
at least one fuel supply device,
at least one supply opening for oxygen-containing oxidant for the fuel combustion,
an inlet for loading a carbonate mineral rock, at the top of the shafts,
an outlet for unloading the calcined material produced, at the bottom of the shafts,
a gaseous effluent discharge duct at the top of the shafts, which is connected to a chimney, and
a supply of cooling air to cool the calcined material produced, the furnace comprising a system for reversing the operation of the shafts, arranged so that each shaft, in production mode, operates alternately in firing mode and in preheating mode, a shaft being in firing mode for a predetermined time period while at least one other shaft is in preheating mode and vice-versa, this reversing system therefore controlling said on and off positions.

According to the invention, the furnace further comprises:
a recirculation circuit which is arranged between the above-mentioned gaseous effluent discharge duct of the shafts and said oxidant supply openings of the shafts and wherein said reversing system controls a collection of at least a portion of gaseous effluent from the shaft in preheating mode, and
a source of concentrated dioxygen that is connected with the recirculation circuit in order to supply it with concentrated dioxygen and thereby form an oxidising mixture, said oxidant supply opening of the shaft in firing mode being supplied in the on position via said reversing system to ensure fuel combustion.

As explained above, the PFRK furnace has a cyclical operation, each shaft operating for a predetermined time period in firing mode, then, after a reversing time of 1 to 2 minutes, in preheating mode, and so on. During the reversing time the reversing system controls, in a synchronised manner, all the changes necessary to move from one mode to the other, for example, by opening the nozzles of the fuel supply device in the shaft when it is in firing mode and closing them when it moves to preheating mode. Therefore, the reversing system controls not only numerous valves and gates, but also the operation of the loading and unloading equipment or of the various suction, pumping or injection elements.

As can be seen, the furnace according to the invention only has a few structural changes to the exterior of the furnace. Therefore, existing furnaces may be easily arranged to implement a calcining method according to the invention.

According to an embodiment of the invention, the shafts have a circular cross-section, said gas transfer channel is a connecting flue that connects the peripheral channels arranged around each shaft so as to allow a gas transfer and, below the connecting flue, the shafts are provided with a collector ring connecting with an evacuation element so as to allow heated cooling air to be removed from the furnace. Advantageously, the circular shafts further comprise, at the bottom of the shaft, a central collector element connecting with an evacuation element so as to allow heated cooling air to be removed from the furnace, below the connecting flue.

According to another embodiment of the furnace according to the invention, the shafts have a rectangular cross-section, a first side of a shaft facing a first side of the other neighbouring shaft and each shaft comprising a second side that is opposite those facing each other, the gas transfer channel being a connecting flue which directly connects one shaft to the other via their first sides and, below the connecting flue, said first sides and said second sides of the shafts are each provided with a collection tunnel connecting with an evacuation element so as to allow heated cooling air to be removed from the furnace.

According to an embodiment of the invention, the furnace comprises, as a dioxygen source for the recirculation circuit, an air separation unit for separating air into dioxygen and dinitrogen. An oxygen tank may also be provided. Advantageously, a heat exchanger supplied with heated cooling air removed from the furnace is mounted on the recirculation circuit to heat the above-mentioned oxidising mixture before it is supplied to the shaft in firing mode.

Other details and features of the furnace according to the invention are mentioned in the appended claims.

Other features of the invention will also be apparent from the description below, which is non-limiting and refers to the appended drawings.

DETAILED DESCRIPTION OF THE INVENTION

In the figures, identical or similar parts use the same references. Conventionally, the shaft shown on the left is in firing mode and the shaft shown on the right is in preheating mode. Standard parts, such as loading or unloading equipment, are not shown or they are shown very schematically, in order to not overload the drawings.

Figure 1:
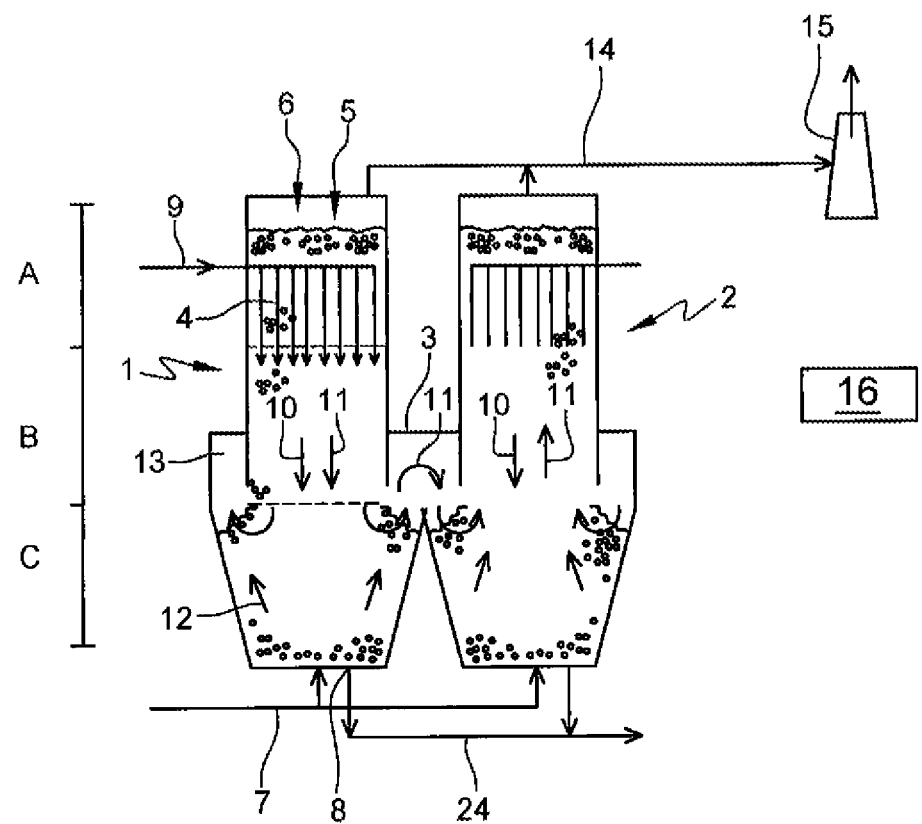
FIG. 1 schematically shows a conventional PFRK furnace.

As can be seen in FIG. 1, the PFRK furnace shown is a vertical double-shaft furnace 1, 2, where the fuel is injected alternately in one shaft 1 then in another 2 for approximately 12 minutes with a stop period between cycles of 1 to 2 minutes to reverse the circuits. This is the "reversing" period. Both shafts have a circular cross-section and are provided with peripheral channels 13 which are interconnected by a connecting flue 3. The shafts are divided vertically into three areas, the preheating area A where the carbonate rock is preheated before calcination, the combustion area B where the firing of the carbonate rock occurs and the cooling area C where the cooling of the calcined material occurs.

When a shaft is in firing mode, here the shaft 1, a fuel supply device in the form of nozzles 4 injects a fuel 9 into the shaft, which, in the example shown, is natural gas. The carbonate rock, loaded at the top of the shaft via an inlet 5 in the open position, progressively descends in the shaft. Combustion air is introduced at the top of the shaft via a supply opening 6, which allows for fuel combustion at the outlet of the nozzles 4 and a decarbonation of the carbonate rock to calcined material 10. The gaseous stream 11 formed by the combustion and decarbonation descends co-currently to the calcined material and, using the peripheral channel 13, moves into the connecting flue 3. Cooling air is introduced via a supply duct 7 at the bottom of the shaft, counter-currently to the calcined material, to cool it. The heated cooling air 12 mixes with the gaseous stream containing the combustion fumes 11 in order to move into the connecting flue 3. The calcined material is unloaded via the outlet 8 into a piece of unloading equipment 24.

When a shaft is in preheating mode, here the shaft 2, the fuel supply device is closed and the nozzles 4 are therefore off. The same applies to the inlet 5 for the carbonate rock and to the opening 6 for supplying combustion air. However, the supply duct 7 for the cooling air and the outlet 8 for the calcined material remain in the open position. After heat exchange with the descending calcined material 10, the heated cooling air mixes with the gaseous stream 11 which, from the connecting flue 3, enters the shaft via the peripheral channel 13. This gaseous stream 11 progresses until it reaches the top of the shaft where it is discharged from the furnace via a discharge duct 14 and transferred to a chimney 15. In the shaft in firing mode 1, this discharge duct 14 is closed.

The furnace also comprises a reversing system 16, shown schematically. It controls, in a synchronised manner, the operation of the shafts during the reversing time of the shafts, either directly or remotely. It controls the switching on and off of all elements of the furnace in such a way that, in production mode, each shaft operates alternately in firing mode and in preheating mode.

In some cases, there are three shafts, two in preheating mode and one in combustion.

FIG. 1 shows a furnace designed for producing 430 tonnes of lime per day. All of the gas flows mentioned in the following are expressed in $Nm^3/t$ of lime produced.

In order to react with the gas injected as a fuel into the shaft 1, 1120 $Nm^3/t$ of combustion air are used to obtain an excess of air of 19% by weight relative to stoichiometric requirements, and in order to form a volume of 100 $Nm^3/t$ of $CO_2$ at combustion. The mass concentration of oxygen in the entering gas is 23%, since it is air. The temperature reached is then far above 900° C., causing a decarbonation of the limestone rock with a release of 380 $Nm^3/t$ of $CO_2$. In order to cool the lime produced to a temperature of about 100° C., 290 $Nm^3/t$ of cooling air are introduced via the bottom of both shafts, which makes a total of 580 $Nm^3/t$. At the chimney, 2250 $Nm^3/t$ of gaseous effluent are obtained which contains 480 $Nm^3/t$ of $CO_2$, i.e., this gaseous effluent has a $CO_2$ content of 23% on dry gas. The $CO_2$ is difficult to use or sequester at this low content and the gaseous effluent is therefore totally released into the atmosphere.

Figure 2A:
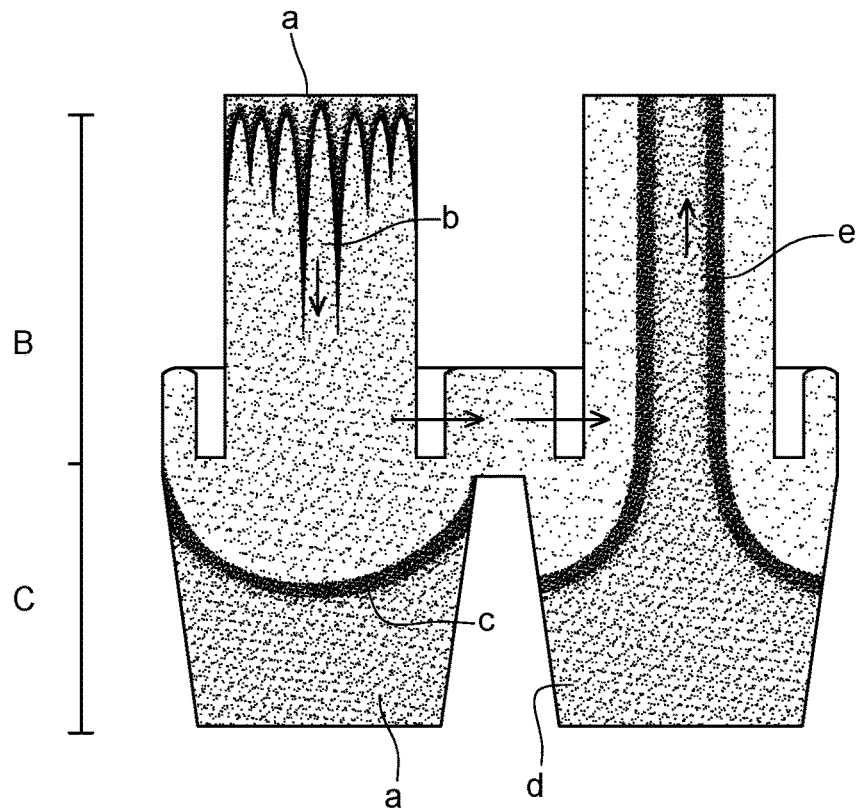
FIGS. 2a and 2b show a digital modelling of the oxygen mass % concentration of the gaseous streams in a conventional PFRK furnace with a circular cross-section and in a conventional PFRK furnace with a rectangular cross-section.

FIG. 2a shows a digital modelling of the PFRK furnace with a circular cross-section, showing the routes of the gases according to their oxygen content. It only shows the combustion area B, from the end of the nozzles, and the cooling area C, and therefore the top of the shafts is not shown.

Areas a: in the shaft in firing mode, cooling air (at the bottom) and combustion air (at the top, just above the end of the nozzles) with an $O_2$ content of 23% by weight.

Areas b: combustion fume jets emitted by the nozzles, in which there is hardly any oxygen left and between which some unreacted $O_2$ can still be found.

Area c: the fumes penetrate deeply into the cooling area C by mixing gradually with the cooling air. They push the gaseous mixture peripherally into the peripheral channel 13, then the connecting flue 3.

Area d: in the shaft in preheating mode, cooling air.

Area e: mixture of the gaseous stream from the peripheral channel 13 and the cooling air. The closer to the centre of the shaft, the more the residual $O_2$ content increases.

Figure 2B:
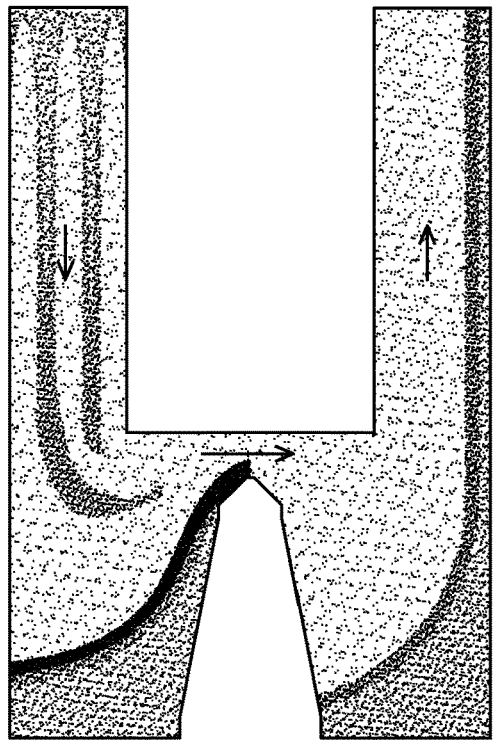

FIG. 2b shows such a digital modelling on a PFRK furnace whose shafts have a rectangular cross-section. Here, the distribution of gas flows is no longer symmetrical like it is in the case of circular shafts.

Figure 3:
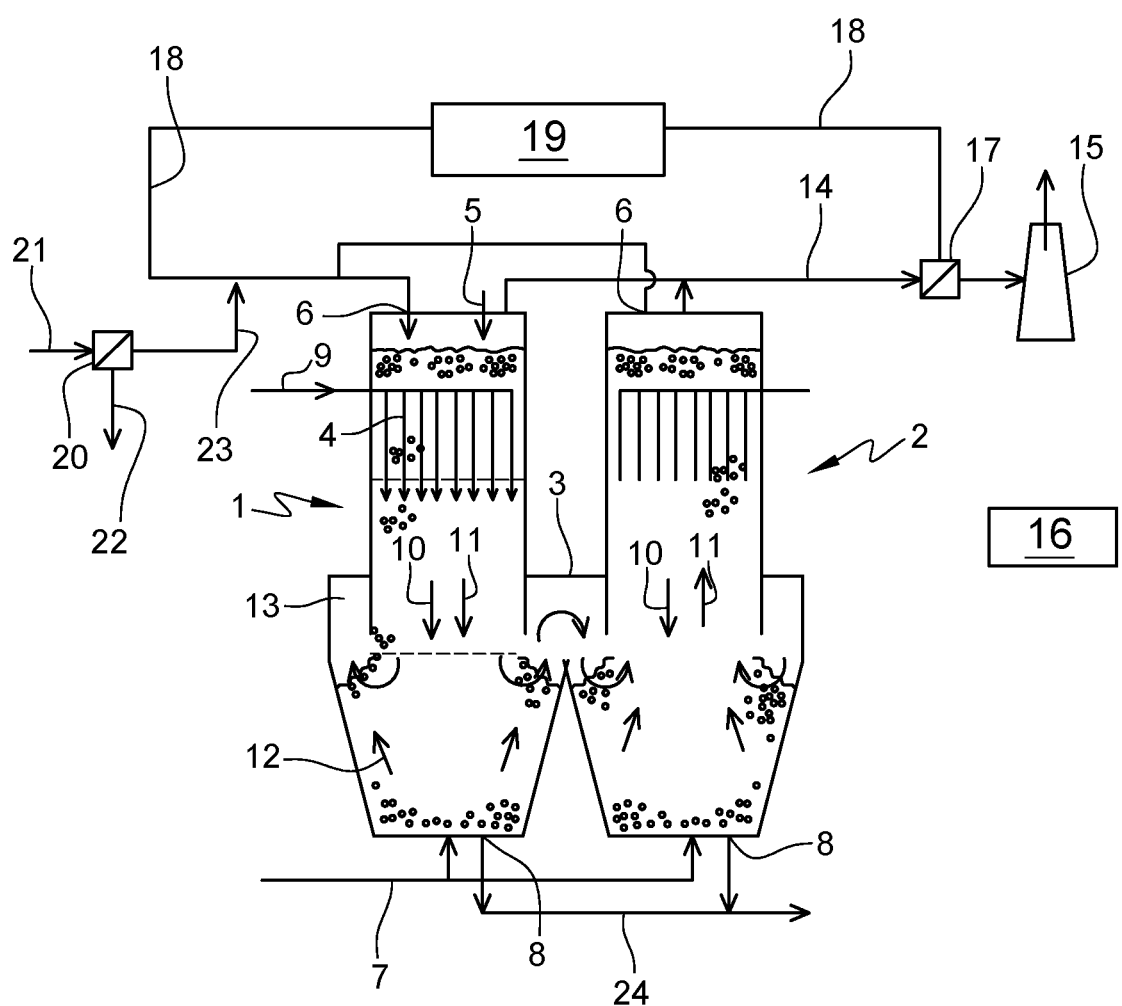
FIGS. 3 and 4 schematically show several embodiments of the furnace with a circular cross-section according to the invention.

FIG. 3 is a view of a furnace according to the present invention. In this case, there are no changes to the structure of the furnace. A separating member 17, capable of collecting a portion of gaseous effluent discharged from the furnace and introducing it into the recirculation circuit 18 has been provided on the exterior, on the discharge duct 14. In this circuit, the collected portion of gaseous effluent is advantageously treated in a treatment unit 19, where it may, for example, be filtered and/or dried. An air separation unit 20 separates air supplied by the duct 21 into $N_2$ discharged via the duct 22 and $O_2$ supplied to the recirculation circuit 18 via the supply duct 23. This circuit 18 then brings the oxidising mixture formed from the recirculated portion of gaseous effluent and concentrated $O_2$ to the top of each of the shafts at the supply opening 6.

The operation of the furnace in FIG. 3 is similar to a PFRK furnace. The separating member 17 is continuously in service, the same as the treatment unit 19 and the air separation unit 20. As has already been seen, the reversing system 16 closes the discharge duct 14 at the top of the shaft in firing mode. However, at the top of this shaft, it opens the supply opening 6 to allow the oxidising mixture to be introduced, while it is closed at the top of the shaft in preheating mode.

The same amount of carbonate rock and the same flows of fuel and cooling air are used as in the conventional furnace described above. 830 $Nm^3$/t of gaseous effluent discharged from the furnace, rich in $CO_2$, is collected via the recirculation duct 18. This recirculated effluent is mixed with 160 $Nm^3$/t of $O_2$, to maintain the same mass concentration of 23% of $O_2$ in the oxidising mixture thus formed and to obtain the same excess of oxygen of 19% by weight relative to stoichiometric requirements during combustion. The nitrogen $N_2$ of the combustion air is thus replaced by the mass equivalent thereof of $CO_2$. Since this is heavier than dinitrogen (specific weight of 1.977 relative to 1.25 $g/Nm^3$), the total volume of the fumes decreases in the furnace, which causes a decrease in the pressure drop of 13% relative to the conventional furnace. At the chimney, 1240 $Nm^3$/t of gaseous effluent is released which, at present, contains 43% by volume on dry gas of $CO_2$. As explained above, industrial use becomes possible at this content, for example in soda ash plants.

As a variant in such a furnace according to the invention, in order to further decrease the input of air in the method, the flow of cooling air may be reduced. For example, this input may be reduced to 50%, which is 290 $Nm^3$/t of cooling air. This reduced volume may be introduced via the supply duct 7 of the only shaft in firing mode or by making use of the supply ducts 7 of both shafts. This measurement reduces the dilution of the fumes by 50%. This results in less cooling of the calcined material that is discharged via the outlets 8. Thus, it becomes necessary to provide unloading equipment that is resistant to a temperature higher than 100° C., for example, a refractory steel unloading table and steel drag chains. Since the lime exits hotter, there has been less heat recovery by the cooling air, which is compensated by a small increase in the input of fuel to a flow such that it causes 120 $Nm^3$/t of $CO_2$ to be formed at combustion. In turn, this increase requires changing the collection of 1730 $Nm^3$/t of gaseous effluent discharged from the furnace in the recirculation circuit to 865 $Nm^3$/t and mixing this collected effluent with 200 $Nm^3$/t of $O_2$ so as to maintain the same mass concentration of 23% of $O_2$ in the oxidising mixture thus formed and to obtain the same excess of oxygen of 19% by weight relative to stoichiometric requirements during combustion. At the chimney, only 865 $Nm^3$/t of gaseous effluent with a high $CO_2$ content of 63% by volume on dry gas is thus obtained.

In fact, a custom $CO_2$ concentration between 40% and 65% by volume of $CO_2$ can be established at the chimney by adjusting the amount of cooling air to between 100% and 50% of the thermodynamic minimum volume necessary to cool the calcined material to a reference temperature of 100° C. A higher concentration of $CO_2$ may be able to be obtained by reducing the input of cooling air to below 50%, within the temperature compatibility limit of the lime with the high-temperature unloading and transport system installed for this purpose.

Figure 4:
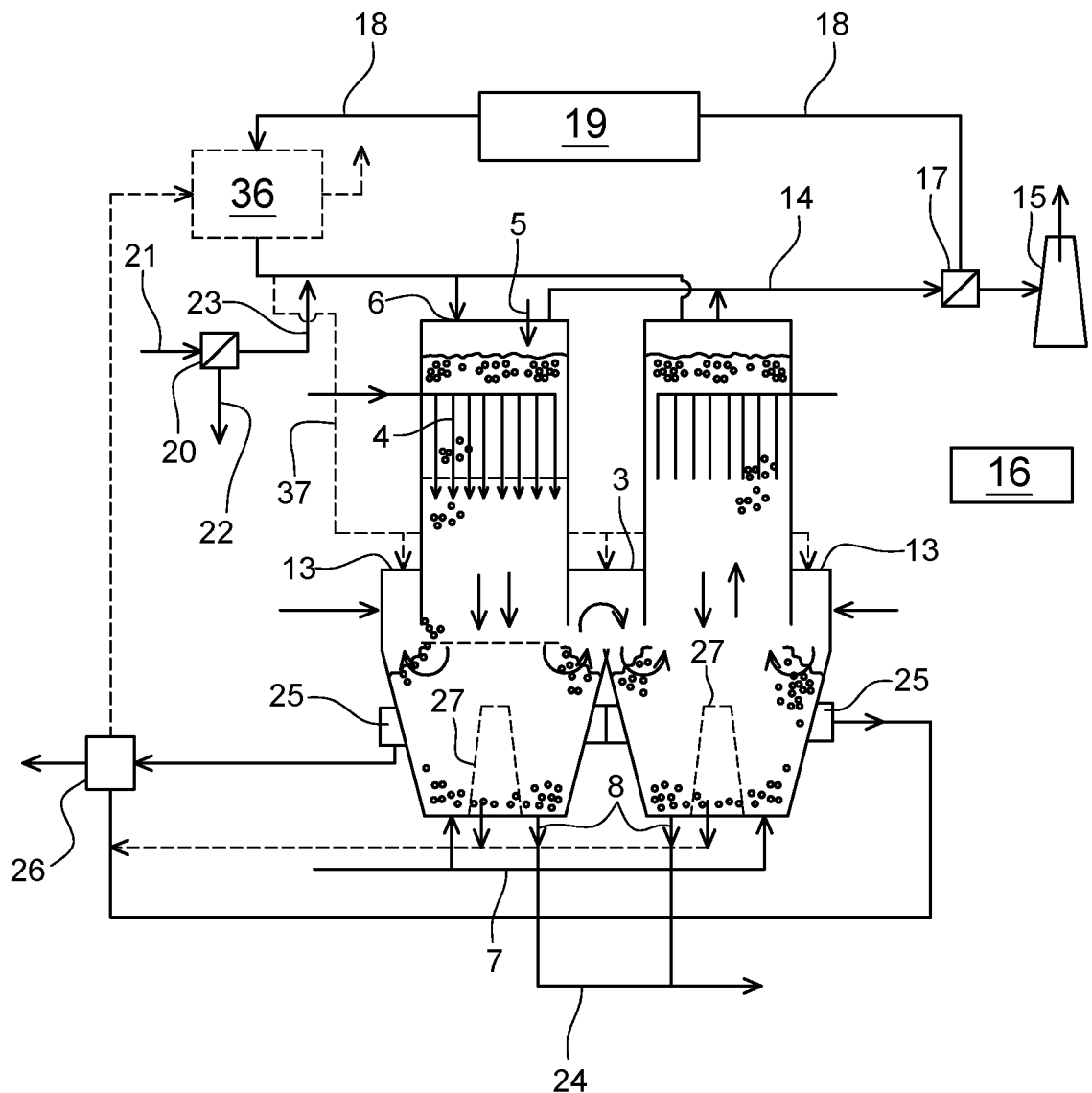

FIG. 4 is a view of an advantageous furnace according to the present invention. As can be seen, this embodiment comprises the features of the embodiment according to FIG. 3, but, in addition, it comprises a small transformation of the external structure of the furnace.

In this case, the heated cooling air is extracted by contact with the calcined material, by installing a removal system. The shafts 1 and 2 are each provided with a collector ring 25, below the connecting flue 3 and the peripheral channels 13, which connects with an evacuation element 26 so as to allow heated cooling air to be removed from the furnace. In this way, a portion or all of the combustion air may be extracted, as required, by also extracting a small proportion of combustion fumes. Indeed, as FIG. 2a shows, because the descending gases penetrate deeply into the cooling area C, the cooling air is pushed towards the external walls of the furnace where the collector ring is arranged. The shafts may further optionally comprise, at the bottom, a central collector element 27 connecting with the evacuation element 26 as to also allow a central removal of the heated cooling air, below the connecting flue 3.

Figure 5:
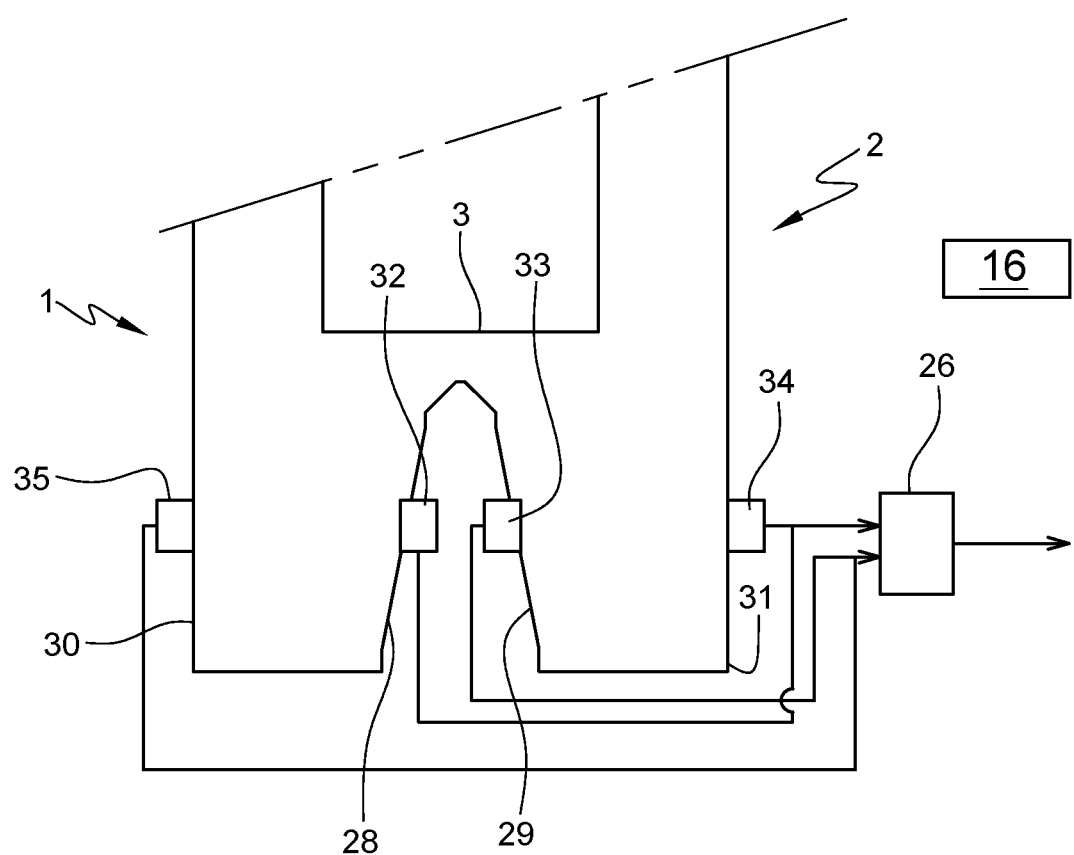
FIG. 5 is a fragmented representation of an embodiment of the furnace with a rectangular cross-section according to the invention.

In the case of rectangular furnaces, it is also possible to extract the cooling air without a collector ring, using side recovery areas. As can be seen in FIG. 5, each shaft includes 4 sides. A side 28 of one shaft faces a side 29 of the neighbouring shaft and each shaft includes a second side 30 and 31, respectively, which is opposite to those facing each other. The gas transfer channel is a connecting flue 3 which directly connects one shaft to the other via the sides 28 and 29 thereof. Below the connecting flue, the sides 28 to 31 are each provided with a collection tunnel 32 to 35, respectively, connecting with an evacuation element 26 so as to allow heated cooling air to be removed from the furnace.

Since the spread of gaseous streams in a rectangular-shaft furnace is not symmetrical (see FIG. 2b), the cooling air is only pushed by the hot fumes to one side. Also, in the furnace shown where the shaft 1 is in firing mode and the shaft 2 in preheating mode, the reversing system 16 only opens the collection tunnels 32 and 34. During the following cycle, only the collection tunnels 33 and 35 will be open.

In the furnace shown in FIG. 4, the same amount of carbonate rock and the same flows of cooling air are used as in the conventional furnace described above. The heated cooling air is removed from the furnace via the evacuation element 26. In the shaft 1, a fuel introduction is performed such that the formation of 105 $Nm^3$/t of $CO_2$ is obtained at combustion. At the top of the shaft 2, 1330 $Nm^3$/t of gaseous effluent is discharged. 730 $Nm^3$/t of this discharged gaseous effluent rich in $CO_2$ is collected via the recirculation circuit 18. This recirculated effluent is mixed with 220 $Nm^3$/t of $O_2$ so as to maintain the same mass concentration of 23% of $O_2$ in the oxidising mixture thus formed and to obtain the same excess of oxygen of 19% by weight relative to stoichiometric requirements during combustion. At the chimney, only 600 $Nm^3$/t of gaseous effluent with a content of 96% on dry gas of $CO_2$ is thus obtained.

In the furnace shown in FIG. 4, in order to recover a portion of the energy from the hot air removed by the evacuation element 26, a heat exchange may be provided with the portion of recirculated gaseous effluent using a heat exchanger 36, before or after the mixing thereof with concentrated dioxygen.

Furthermore, in the connecting flue 3 and the peripheral channels 13, an injection of a fraction of said collected portion of gaseous effluent discharged from the furnace using an injection duct 37 may also be provided. Optionally beforehand, a heat exchange between the heated cooling air removed from the furnace, and this above-mentioned fraction to be injected may occur using a heat exchanger, for example the heat exchanger 36. In the absence thereof, a heat exchanger not shown may be provided on the injection duct 37.

According to yet another variant, the temperature in the connecting flue may be mitigated by injecting water at selected locations of the flue and/or peripheral ring. This added water has no dilution effect on the concentration of $CO_2$ on dry gas.

Such arrangements to recover the heat from the heated cooling air removed from the furnace, using a heat exchanger as well as such $CO_2$ or water injecting devices in the connecting flue may also naturally be provided with rectangular-shaft furnaces.

It is clear that a furnace similar to that shown in FIG. 4 may be designed, where the cooling air is injected at the bottom of only one of the two shafts.

Table 1 below includes the flows in a conventional furnace and in different furnace variants according to the invention and Table 2 includes the amounts of the various gaseous elements at the inlet of the furnaces.

In the examples column, 1 indicates a conventional PFRK furnace, 2 and 3 are furnaces according to FIG. 3 with variable flows of cooling air and 4 and 5 are furnaces according to FIG. 4 with and without a heat exchanger.

TABLE 1

| | Combustion air $Nm^3/t$ | Cooling air $Nm^3/t$ | $O_2$ injection $Nm^3/t$ | Recycled effluent $Nm^3/t$ | Effluent at the top of the furnace $Nm^3/t$ | Chimney effluent $Nm^3/t$ | DP* |
|---|---|---|---|---|---|---|---|
| 1 | 1120 | 580 | 0 | — | 2250 | 2250 | DP |
| 2 | 0 | 580 | 160 | 830 | 2070 | 1240 | −13% |
| 3 | 0 | 290 | 200 | 865 | 1730 | 865 | −26% |
| 4 | 0 | 580 | 220 | 730 | 1330 | 600 | −49% |
| 5 | 0 | 580 | 250 | 820 | 1440 | 620 | −39% |

*DP = pressure loss

TABLE 2

| | $O_2$ injection $Nm^3/t$ | $O_2$ kg/t | $N_2$ kg/t | $CO_2$ kg/t | Mass % of $O_2$ | Stoichiometric $O_2$ kg/t | Excess of $O_2$ % |
|---|---|---|---|---|---|---|---|
| 1 | 0 | 333 | 1090 | 0.89 | 23 | 281 | 19 |
| 2 | 160 | 331 | 448 | 646 | 23 | 278 | 19 |
| 3 | 200 | 367 | 277 | 915 | 23 | 303 | 18 |
| 4 | 220 | 346 | 5 | 1143 | 23 | 294 | 18 |
| 5 | 250 | 394 | 6 | 1284 | 23 | 327 | 20 |

It is understood that the present invention is in no way limited to the embodiments described above and that changes can be made without departing from the scope of the appended claims.

For example, replacing the fuel injection nozzles, cooled by air, with thermally insulated nozzles may be advantageously provided,

The invention claimed is:

1. Method for calcining mineral rock in a regenerative parallel-flow vertical shaft furnace, wherein at least two shafts are interconnected via a gas transfer channel, the method comprising, in production mode,
   loading the carbonate mineral rock at a top of the furnace,
   preheating said rock,
   firing said rock with the decarbonation thereof into calcined material,
   cooling the calcined material via cooling air, and
   unloading the calcined material at a bottom of the shafts,
      each shaft operating alternately in firing mode and in preheating mode, one shaft being in firing mode for a predetermined time period while at least one other shaft is in preheating mode, and vice-versa,
   the firing mode comprising:
   said loading of carbonate mineral rock at the top of the shaft in firing mode,
   in the presence of said preheated carbonate mineral rock descending into said shaft, combusting fuel in the presence of oxygen so as to obtain said firing of said rock and the decarbonation thereof into calcined material with the release of combustion fumes in the form of a gaseous stream descending co-currently in the shaft in firing mode, and said gaseous stream containing these combustion fumes moving from the shaft in firing mode to said at least one shaft in preheating mode using said gas transfer channel,
      the preheating mode comprising:
   said preheating of the loaded carbonate mineral rock via heat exchange with the gaseous stream containing the combustion flumes from the gas transfer channel, which is ascending in said at least one shaft in preheating mode, counter-currently to said loaded carbonate mineral rock, and discharging from the furnace a gaseous effluent based on the gaseous stream containing the combustion fumes, at the top of said at least one shaft in preheating mode,
   the method further comprises
      collecting a portion of the gaseous effluent discharged from the furnace,
      forming an oxidizing mixture by mixing said collected portion of the gaseous effluent discharged from the furnace with concentrated dioxygen, and
      introducing this oxidizing mixture at the top of the shaft in firing mode so as to ensure said fuel combustion in the presence of oxygen,
   the gaseous effluent discharged from the furnace being concentrated in $CO_2$ and having a $CO_2$ content of at least 60% by volume on dry gas.

2. Method according to claim 1, wherein said cooling of the calcined material comprises, at the bottom of each of the shafts, supplying cooling air which flows counter-currently through the descending calcined material and is heated on contact with it, in that the heated cooling air mixes with the gaseous stream containing the combustion fumes in the shaft in firing mode before moving through the gas transfer channel and, after moving, with this gaseous stream in said at least one shaft in preheating mode, and in that the gaseous effluent concentrated in $CO_2$ discharged from the furnace contains the combustion fumes and the cooling air.

3. Method according to claim 2, wherein the cooling air is supplied to the furnace in a total volume equal to or less than a thermodynamic minimum necessary to cool the calcined material to a reference temperature of 100° C.

4. Method according to claim 3, wherein the total volume of cooling air supplied to the furnace is about 40 to 60% of said thermodynamic minimum.

5. Method according to claim 1, wherein said cooling of the calcined material comprises, at the bottom of the only shaft in firing mode, supplying cooling air which flows counter-currently through the descending calcined material and is heated on contact with it, in that the heated cooling air mixes with the gaseous stream containing the combustion fumes before moving through the gas transfer channel, and in that the gaseous effluent concentrated in $CO_2$ discharged from the furnace contains the combustion fumes and the cooling air.

6. Method according to claim 1, wherein said cooling of the calcined material comprises, at the bottom of each of the shafts or at the bottom of the only shaft in firing mode, supplying cooling air which flows counter-currently through the descending calcined material and is heated on contact with it, in that the method further comprises removing the heated cooling air from the furnace and in that the gaseous effluent discharged from the furnace contains a $CO_2$ content of at least 90% by volume on dry gas.

7. Method according to claim 6, wherein it further comprises a heat exchange between the heated cooling air, removed from the furnace, and said collected portion of gaseous effluent discharged from the furnace, before or after it is mixed with concentrated dioxygen.

8. Method according to claim 6, wherein it further comprises, in the gas transfer channel, injecting a fraction of said collected portion of gaseous effluent discharged from the furnace and, optionally before this injection, a heat exchange between the heated cooling air, removed from the furnace, and the above-mentioned fraction to be injected.

9. Method according to claim 1, wherein it further comprises, in the gas transfer channel, injecting water.

10. Method according to claim 1, wherein said fuel combustion comprises introducing a gaseous fuel, liquid fuel or solid fuel into the shaft in firing mode and in that, in the case of a solid fuel, said introduction is carried out using a portion of said collected portion of gaseous effluent discharged from the furnace as a carrier gas, or using another source of $CO_2$ as a carrier gas".

11. Method according to claim 1, wherein said fuel combustion occurs in the presence of an excess of oxygen relative to stoichiometric requirements.

12. Regenerative parallel-flow vertical shaft furnace for implementing the method according to claim 1, comprising
at least two shafts, interconnected by a gas transfer channel,
each of said shafts comprising, in the on or off position,
at least one fuel supply device,
at least one supply opening for oxygen-containing oxidant,
an inlet, for loading carbonate mineral rock, at the top of the shafts,
an outlet for unloading the calcined material produced, at the bottom of the shafts,
a gaseous effluent discharge duct at the top of the shafts, which is connected to a chimney, and
a supply of cooling air to cool the calcined material produced,
the furnace comprising a system for reversing the operation of the shafts, arranged so that each shaft, in production mode, operates alternately in firing mode and in preheating mode, a shaft being in firing mode for a predetermined time period while at least one other shaft is in preheating mode, and vice-versa, this reversing system therefore controlling said on and off positions,
wherein it further comprises
a recirculation circuit which is arranged between the above-mentioned gaseous effluent discharge duct of the shafts and said oxidant supply openings of the shafts,
a separating member, capable of collecting a portion of gaseous effluent discharged from the furnace via the duct and introducing it into the recirculation circuit, and
a source of concentrated dioxygen that is connected with the recirculation circuit in order to supply it with concentrated dioxygen and thereby form an oxidizing mixture, said oxidant supply opening of the shaft in firing mode being supplied in the on position via said reversing system to ensure fuel combustion, and
wherein the shafts have a circular cross-section, in that said gas transfer channel is a connecting flue that connects the peripheral channels arranged around each shaft so as to allow a transfer of gas and in that, below the connecting flue, the shafts are provided with a collector ring connecting with an evacuation element so as to allow heated cooling air to be removed from the furnace, or
the shafts have a rectangular cross-section, in that a first side of a shaft faces a first side of a neighboring shaft and each shaft comprises a second side that is opposite those facing each other and in that the gas transfer channel is a connecting flue which directly connects one shaft to the other via their first sides, and in that, below the connecting flue, said first sides and said second sides of the shafts are provided with a collection tunnel connecting with an evacuation element so as to allow heated cooling air to be removed from the furnace.

13. Furnace according to claim 2, wherein the circular shafts further comprise, at the bottom, a central collector element connecting with an evacuation element so as to allow heated cooling air to be removed from the furnace, below the connecting flue.

14. Furnace according to claim 12, wherein the furnace comprises, as a dioxygen source for the recirculation circuit, a unit for separating air into dioxygen and dinitrogen.

15. Furnace according to claim 12, wherein a heat exchanger supplied with heated cooling air removed from the furnace, is mounted on the recirculation circuit.

16. Furnace according to claim 12, wherein it comprises equipment for unloading calcined material that is resistant to temperatures greater than 100° C.

* * * * *